July 22, 1941.   A. THALMANN   2,250,241
DEVICE FOR CONTROLLING THE FEED MOVEMENT OF A MACHINE
PART BY MEANS OF A HYDRAULIC SYSTEM
Filed Dec. 14, 1939   7 Sheets-Sheet 1

Inventor:
Alfred Thalmann,
By Sommers & Young
Attys

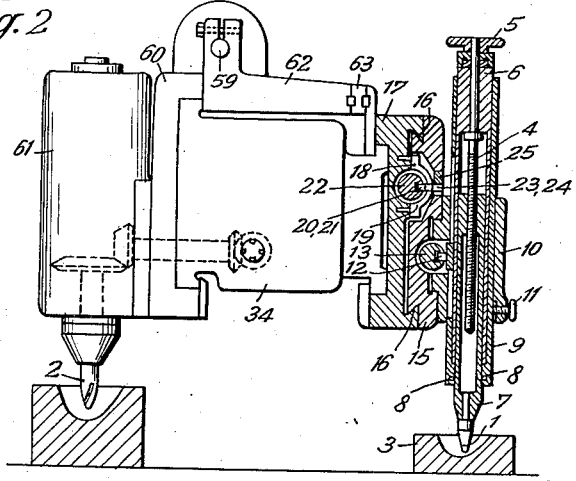
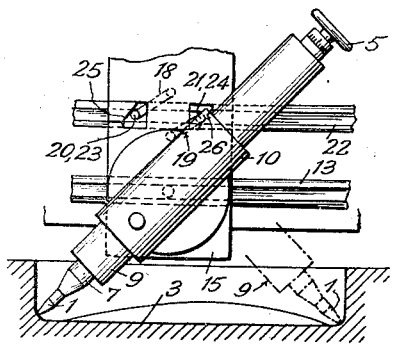
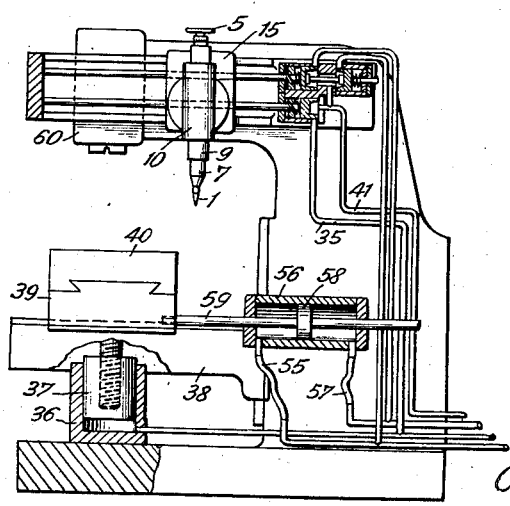

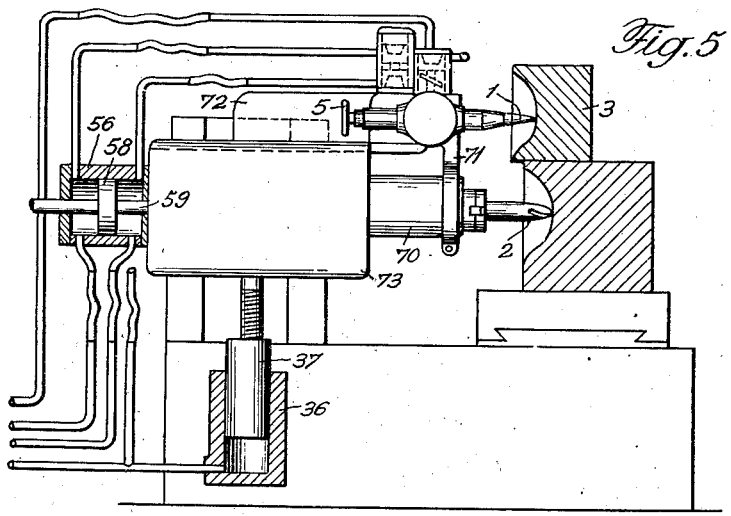
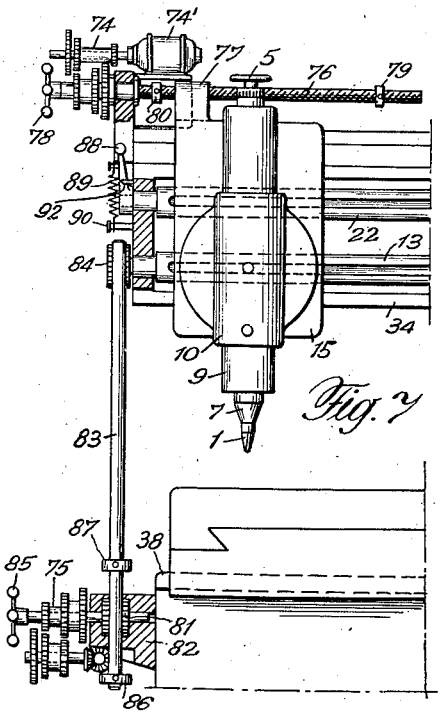
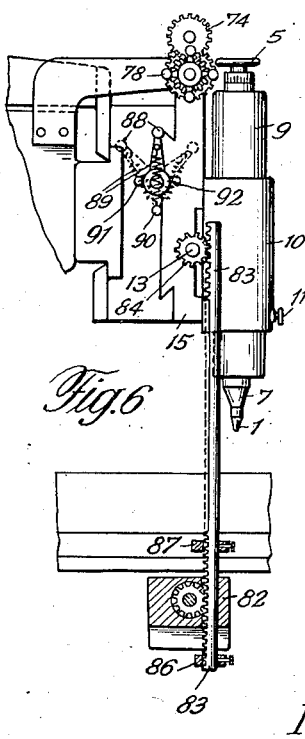

Inventor:
Alfred Thalmann
By Sommers & Young Attys

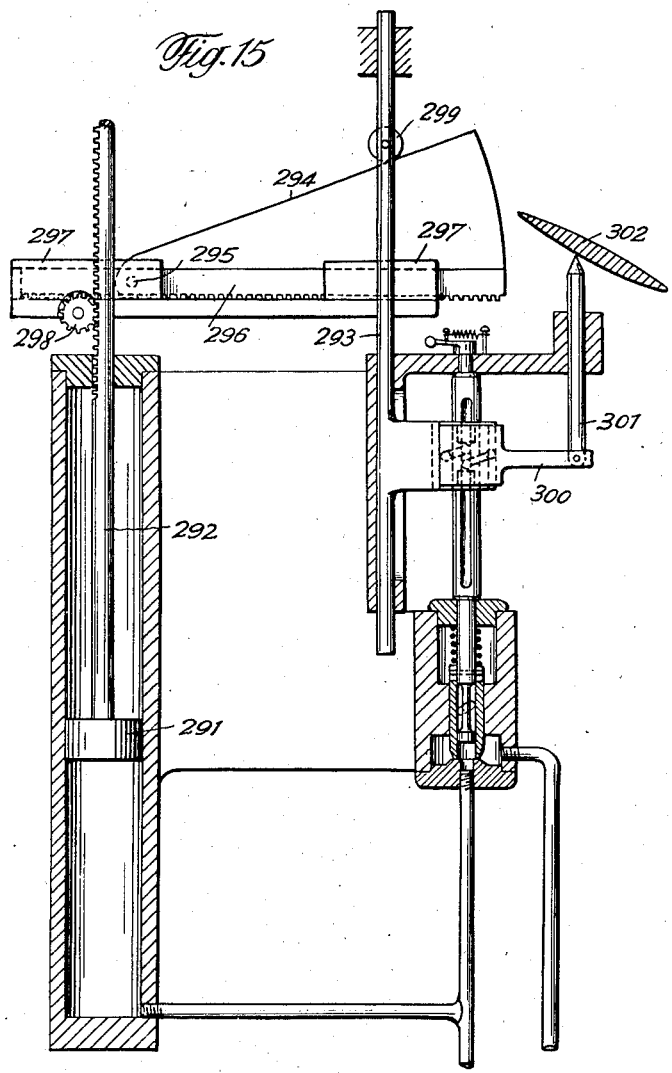

Patented July 22, 1941

2,250,241

UNITED STATES PATENT OFFICE 2,250,241

DEVICE FOR CONTROLLING THE FEED MOVEMENT OF A MACHINE PART BY MEANS OF A HYDRAULIC SYSTEM

Alfred Thalmann, Rorschacherberg, Switzerland, assignor to Starrfräsmaschinen A.-G., Rorschach, Switzerland Application December 14, 1939, Serial No. 309,298 In Switzerland December 24, 1938

26 Claims. (Cl. 90—13.5)

This invention relates to devices for controlling the feed movement of a machine part by means of a hydraulic system including one or more pressure fluid operated pistons and associated cylinders, and particularly to hydraulic copying devices associated with machine tools and provided with one or more working pistons controlled by a pressure fluid in accordance with the movements of a tracer, the piston rod being connected with the work piece or the tool carrier.

Hydraulic copying devices exist in which the valves are opened and closed exclusively by spring pressure and the valve control movements are effected from the tracer through the intermediary of directly acting linkages or of rotating shafts and associated gear wheels. In such arrangements usually provision is made for the valves to travel in unison with the working piston. The accuracy of operation of such devices is detrimentally affected to a great extent by lost motion, disuniformity of pitch of gear teeth, and so forth. Furthermore, valves that are operated by spring effort exclusively have a great tendency to vibrate which may have a highly detrimental effect on the smoothness of the surfaces machined. The setting up of such vibrations can in most cases be prevented, to some extent only, by strongly compressing the valve springs, which measure, however, requires the bearing pressure of the tracer to be accordingly increased, whereby the surface of the pattern and the accuracy of the work produced are impaired to a considerable extent. Moreover, there are known, what may be termed, traversing copying devices in which the tracer appurtenance must move on a separate slide track for the full length of travel of the working piston by being connected with the valve also travelling for the full length of movement of the working piston by a transmission linkage.

From these known devices the device according to the invention is distinguished in that the element controlling the feed movement, for example, the tracer mounted in an adjustable tracer head of a hydraulic copying device, is positively connected with one or more valves by means of a linkage devoid of lost motion, the valves being disposed in a control chamber which is arranged independently of the one or more cylinders, that is, the one or more working pistons and is connected with the pressure fluid pipe lines.

By mounting the valves in control chambers arranged independently of the working cylinders direct communication between the valves and the tracer head can be effected, and the valves which thus do not share in the movements of the working piston are positively guided with freedom from play. By this means faulty copying due to frictional influences, lost motion, and so forth, can be completely eliminated. The adjustable tracer head permits the working position of the tool to be appropriately chosen. It is further very easy to work backed off work pieces by relieving, relief milling, relief grinding, recessing, and so forth. Also steeply ascending and even vertical surfaces or shoulders can be worked with ease without rearranging or refixing the work piece.

With devices, according to the invention, advantageously, between the piston rod of the working piston and the element controlling the feed movement a mechanism is intercalated which permits the path of travel of a feed member operating the valves and being positively connected to the control element, to be varied relative to that of the piston rod, i. e., to be reduced or increased.

The mechanism may be so constructed that the amount of variation can be adjusted.

In the accompanying drawings several embodiments of the invention are illustrated, by way of example only, most of which are constructed as hydraulic copying devices.

Figs. 1 to 3 exemplify a first embodiment of the invention representing a vertically and transversely operating copying device provided on a milling machine, Fig. 1 showing an elevation partly in section through the control chambers, valves and working pistons of the copying device, Fig. 2 being a vertical section of the tracer head and the connection between the slide plate of the tracer head and the transversely guided working piston, and Fig. 3 being a view of the tracer head in an inclined position.

Fig. 4 shows by way of example an elevation partly in section of a second embodiment of the invention representing a vertically and transversely operating copying device provided on a milling machine having a cross-slide support and a vertical spindle head;

Fig. 5 shows by way of example an elevation of a third embodiment representing a vertically and transversely operating copying device provided on a milling machine having a fixed bed and a transversely adjustable horizontal spindle as well as a vertically adjustable spindle box;

Figs. 6 and 7 show by way of example in an end elevation and a side elevation partly in section, respectively, details of mechanical vertically and transversely operating adjusting means for the tracer, and of quick setting means for the tracer;

Fig. 13 shows by way of example a schematic sectional elevation of a device for controlling a horizontal feed movement;

Fig. 14 shows by way of example a vertical section of a further device serving for controlling a vertical feed movement, and Fig. 15 shows by way of example also a vertical section of another device serving for controlling a vertical feed movement.

Figure 1:
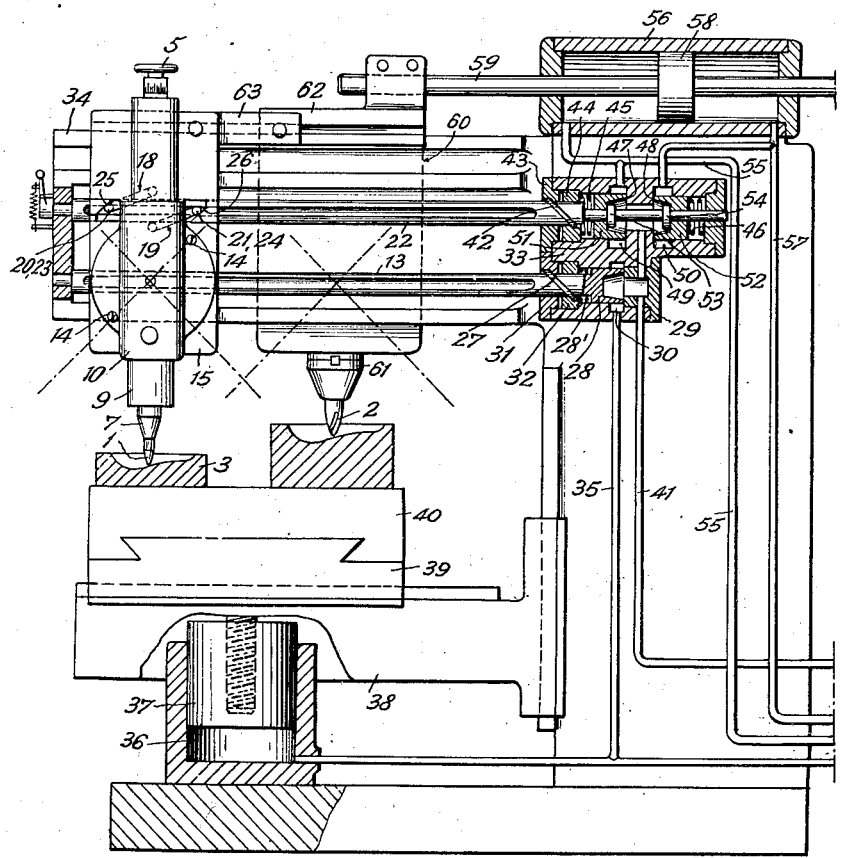

In the embodiment of the invention shown in Figs. 1 to 3 the element controlling the feed movement is provided by a tracer pin 1, which may be replaced by a tracer roller. The tracer pin 1 slides over the pattern or mould 3 in accordance with the shape of the cutting edge of the tool 2 as soon as the position of the pattern or of the tracer pin is varied by a movement in the longitudinal, transverse or vertical direction. As shown in Fig. 2, the tracer pin 1 is mounted in a tracer sleeve 7 which is adjustable relative to a sleeve 6 by means of a screw spindle 4 provided with a hand wheel 5. Rollers 8 arranged in a guide sleeve 9 provide for the tracer sleeve 7 to be easily displaceable during the copying operation.

The guide sleeve 9 which is extensively mounted in a tracer head 10 and can be fixed in position by means of a screw 11 serves for guiding the tracer sleeve 7 so as to ensure smoothness of action of the latter. The sleeve 6 carries a roller 12 which is guided in a longitudinal groove in a valve control rod 13. The tracer head 10 is rotatably mounted and can be clamped in position on a cross slide 15 by means of screws 14. The cross slide 15 in turn is guided by a guide 16, which may also be constructed as a roller guide, arranged on a slide plate 17 which is displaceably mounted on a cross carrier arm 34 of the machine and pivotally carries two levers 18, 19. On these levers rollers 20, 21, respectively, are mounted by means of transverse bearing pins which rollers slidingly engage with the longitudinal groove of a valve control rod 22. On the same bearing pins further rollers 23, 24, respectively, are mounted which can be relatively so adjusted by oblique faces on sliding blocks 25, 26, respectively, provided on the cross slide 15, that the rollers 20, 21 bear against the respective side surfaces of the longitudinal groove of the valve control rod 22 free from play.

For the copying in the vertical direction the valve control rod 13 carries at one end a helical collar 27 and a head-like valve body 28 which is urged against a mating valve seat 29 by an associated spring 28' so as to shut off a control chamber 30. The helical collar 27 is supported without play in two adjustable sliding guide rings 31, 32 which are each provided with a helical guide groove corresponding to the helical collar 27 and mounted in a control head 33. The control head 33 is secured to the cross carrier arm 34 of the machine and the control chamber 30 communicates with a continually delivering liquid supply pump and a working cylinder 36 through a pressure conduit 35.

In a cylinder 36 a working piston 37 is guided which carries a supporting bracket 38, a cross slide 39 and a work carrier 40. A pipe line 41 serves for returning the pressure fluid discharging from the control chamber 30 to the feed tank of the pump, when the valve 28 is opened.

For the copying in the transverse direction the valve control rod 22 carries at one end a helical rim 42 which is mounted free from play in the guide head 33 by means of adjustable slide carrier rings 43, 44 having mating helical grooves. Two valve bodies 51, 52 for closing the mating valve seats 47, 48, of the corresponding control chambers 49, 50 from opposite directions by action of springs 45, 46, respectively, are distanced from each other by collars 53, 54, respectively. The control chamber 49 communicates through a pressure pipe line 55 with a continually delivering fluid supply pump and with the left hand pressure space of a cylinder 56 for effecting the transverse movements (Fig. 1) whereas the control chamber 50 is connected with a continually delivering fluid supply pump and with the right hand pressure space of the cylinder 56 by means of a pressure pipe line 57. The pressure fluid discharging by the alternate opening of the valves 51, 52 returns through the pipe line 41 to the feed tank of the pump.

In the cylinder 56 a working piston 58 is guided through a piston rod 59, which is connected with a tool carrier 60 which is guided by the cross carrier arm 34 and on which a milling cutter fixture 61 holding the tool 2 is rockably mounted. A guide member 62 and an intervening piece 63 connect the slide plate 17 of the tracer head with the tool carrier 60. By this means the transverse shifting of the tracer head is effected from the working piston, in consequence of which, the control of the valves by means of the cross slide 15 can be easily and precisely effected without being disturbed by any resistances that may set up due to sliding friction produced by the transverse movement of the tracer head.

The operation of the vertically working copying device shown in Figs. 1 to 3 is as follows:

Each axial pressure effect on the tracer pin 1 results in a rotational adjustment of the valve control rod 13 through the intermediary of the above described construction of the tracer appurtenance. The helical collar 27 supported in the sliding guide rings 31, 32 accordingly effects by virtue of this rotational movement of the valve control rod 13 a positive axial adjustment of the valve control rod 13 and thus of the valve body 28. In the inoperative position the valve 28 is closed by the valve body bearing on the valve seat 29, whereas the tracer 1 does not contact with the pattern 3. If the pump is connected and the pressure in the pipe line 35 and in the cylinder 36 has become uniform the piston 37 rises and the work carrier 40 together with it until the pattern contacts with the tracer pin 1. The pressure acting on the tracer 1 then opens the valve 28 in the manner previously described for a length of travel required for continuously discharging such an amount of pressure fluid through the valve opening into the return pipe line 41 that the fluid pressure below the working piston is adapted to maintain the bracket carrying the work carrier at a constant height. If the pressure on the tracer increases, due to the pattern shifting toward the tracer, the valve opening is immediately also increased and the pressure below the working piston is accordingly decreased so that the bracket descends together with the work carrier by gravitational action. If, inversely, the pressure on the tracer decreases the valve opening is accordingly reduced, and the pressure below the working piston increases, thereby raising the piston and the work carrier together with it, as previously explained.

The transversely working copying device operates similarly to the vertically working copying device except that the working piston 58 is acted upon by fluid pressure in both directions of copying. Each pressure effect on the tracer 1 in the transverse direction thereof shifts the cross slide 15 of the tracer head 10 in the direction in which the pressure acts. The wedge-shaped sliding blocks 25, 26 on the cross slide 15 move the roller 20, 21, respectively, engaging with the longitudinal groove in the valve control rod 22, accordingly, whereby the valve control rod 22 is rotationally displaced and one or the other of the opposing valves 51, 52 is opened in dependence upon the direction in which the pressure acts on the tracer and the corresponding direction in which the valve control rod 22 rocks by action of the helical collar 42. Due to the fluid pressure decreasing in the pressure space of the working cylinder 56 communicating with the opened valve, the working piston 58 and the tool carrier 60 together with it as well as the tracer head 10 firmly connected to the latter are shifted by the excess of pressure existing in one pressure space of the working cylinder 56. If the pressure on the tracer 1 is relieved or if the pressure acts in the opposite direction the operation of the copying device is inversed.

The embodiment of the invention shown in Fig. 4 differs from the embodiment shown in Figs. 1 to 3 in that in this instance the transverse movement is carried out by the work slide 39 instead of by the tool carrier 60 and the slide 15. The cylinder 56 for the transverse movement is arranged on the vertically displaceable supporting bracket 38 and the piston rod 59 is connected to the slide 39. Since the supporting bracket 38 moves vertically the pressure fluid pipe lines 55, 57 are made of flexible material. The linkages devoid of play interposed between the tracer and the valves for the vertical and the transverse movement, respectively, are of a construction similar to that described in connection with the first embodiment.

In the copying device exemplifying the invention as shown in Fig. 5 the tracer appurtenance and the control chambers associated with the linkages devoid of play interposed between the tracer and the respective valves are mounted on a slide 72 which is firmly connected to the horizontally disposed milling spindle 70 by means of a driving member 71. The copying device is mounted on a slide 72 in a position turned through an angle of 90° compared with the arrangement shown in Fig. 1. The slide 72 shown in Fig. 5 is an equivalent of the slide plate 17 in Fig. 1. The control chambers are placed on the slide 72 and connected with the pressure pump by means of flexible conduits in adaptation to the movements of the vertically displaceable spindle box 73.

Figs. 6 and 7 each show vertically and horizontally operating mechanically actuated adjusting means in conjunction with different hand-operable quick setting means, as these means are arranged in a machine tool provided with a hydraulic copying device as shown in Figs. 1 to 3. In order to permit the vertical or the transverse movement of the tool slide, that is, the work slide, to be hydraulically controlled by means of the tracer head 10 without using the pattern, in the instance, mechanical feed drives 74, 75 are provided. The drive 74 coupled to a motor 74' drives, when connected, a screw spindle 76 which is mounted in the cross carrier arm 34 and actuates the cross slide 15 by means of a nut 77 provided on this cross slide 15 for the tracer head 10, thereby operating the valves 51, 52 (Fig. 1) through the intermediary of the transmission means shown in Fig. 1 and the valve control rod 22. In this way the transverse movement of the tool slide, that is, the work slide, is mechanically effected within a certain range of feed travel.

Such a transverse movement can be effected quickly by hand, while the drive is disconnected by turning a handle 78, which is directly connected to the spindle 76, in the direction of movement required. The thread of the spindle 76 ascends steeply and is not self-braking so that the copying movement of the cross slide 15 is not detrimentally affected. By means of adjustable stops 79, 80 arranged on the screw spindle 76 the transverse travel can be limited to any desired extent by these stops operating electric switches which disconnect or reverse the feed motor respectively.

If the feed of the vertical movement is mechanically effected the drive 75 drives a gear wheel 81 which is mounted in a mounting member 82 on the supporting bracket 38 (see Fig. 1). By this means pressure is exerted on a vertical rack 83 which is connected with the valve control rod 13 by a gear wheel 84. The slightest relative movement of the valve control rod 13 initiates the actuation of the valve body 28 (see Fig. 1) so that the supporting bracket 38 is either raised or lowered. Since the rack 83 can perform only relatively small movements by virtue of its operative connections with the gear wheel 84 and the valve control rod 13 the gear wheel 81 rolls on the rack 83 during the movement of the supporting bracket under continual pressure action. The feed drive 75 is driven mechanically or by motor power. If the drive is disconnected the supporting bracket can be adjusted quickly and with ease by hand by means of a handle 85 connected with the gear wheel 81. The operation of the device is similar to that obtained by mechanical actuation. By means of adjustable stops, 86, 87 the vertical movement can be limited like the transverse movement.

In order to provide for directing the transverse movement of the copying device toward a certain side without the assistance of the pattern a preadjusting device is arranged on the valve control rod 22. A lever arm 88 is secured to the valve control rod 22. If the lever arm 88 is in zero-position a tension spring 89, which on the one hand is connected to the lever arm 88 and on the other to a bolt 90 on the cross carrier arm 34 of the machine, exerts a pull on this arm in a direction extending in the vertical middleplane of the lever arm 88. The rocking movements of the lever arm 88 toward both sides are limited by two stop bolts 91, 92. As the lever arm 88 rocks toward one or the other of the stops 91, 92 the upper end of the spring 89 is moved along whereby the spring 89 is adapted to pull the lever arm 88 against the respective stop. By this means the valve control rod 22 is rocked either to the left or right hand side, thereby controlling the valves 51, 52 respectively. As the pattern acts on the tracer reaction pressure is exerted on the valve control rod 22 and the spring 89 so that either of the valves 51, 52, that is, the transverse movement of the tool carrier, i. e. the work carrier, is accordingly controlled.

Figure 8:
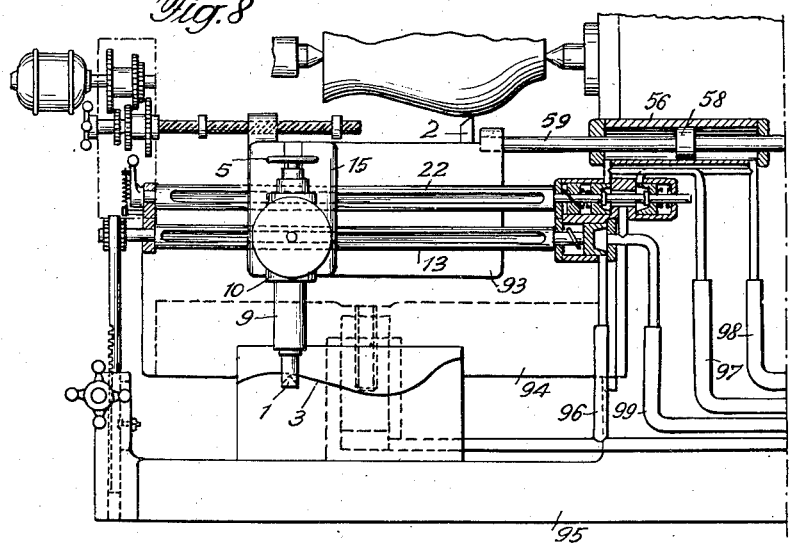
Fig. 8 shows by way of example an elevation partly in section of a fourth embodiment representing a horizontally and vertically operating copying device provided on a turning machine having a vertically adjustable tool slide.

The operation of the copying device shown in Fig. 8 in conjunction with a turning machine, the tool of which can be set in the vertical direction from below, corresponds to that of the copying device shown in Figs. 1, 6 and 7. The tracer head is, in this instance, secured to the cross slide, whereas the tool carrier 93 and the control chambers are connected to the supporting bracket 94. The pattern 3 is arranged on the base 95 of the standard. The pressure pipe lines 96, 97, 98 and the return pipe line 99 are flexibly connected with the control chambers of the copying device. The working cylinder, the feed drive, the quick setting device and the preadjusting device for the transversely operating copying device are secured to a supporting bracket 94, whereas the working cylinder, the feed drive and the quick setting device of the vertically operating copying device are secured to the base 95 of the standard.

In this turning machine the pattern 3 is so fastened that the tracer pin 1 exerts a pull on the valve control rod 13 as the supporting bracket 94 ascends. By this means the quick setting of the supporting bracket can be effected in any working position. The vertical feeds for setting the depth of cut are effected in accordance with Fig. 2, and the adjustment of the obliquity of the tracer can be easily effected in the manner illustrated in Fig. 3.

Figure 9:
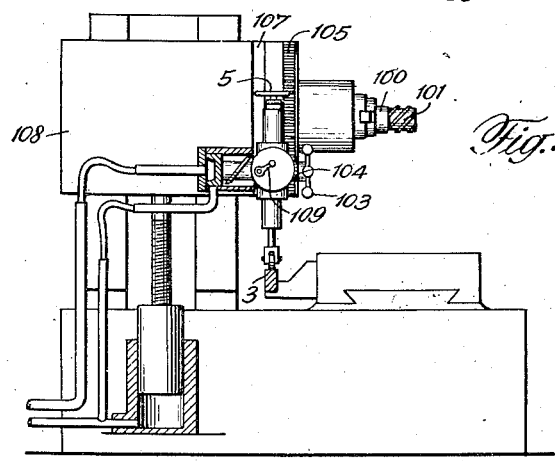
Fig. 9 shows by way of example an elevation partly in section of a fifth embodiment representing a vertically operating copying device provided on a combination milling and grinding machine having a fixed bed and a vertically adjustable spindle box.

The copying device exemplifying the invention as shown in Fig. 9 is arranged on a combination milling and grinding machine, having a fixed bed, a longitudinally displaceable work table and a vertically adjustable spindle box. The tracer head is constructed in a manner similar to that explained in connection with Figs. 1, 2 and 3, but is adapted only for vertical copying work, the slide plate 17, the valve control rod 22, and so forth, being omitted. The working spindle 100 is adapted for holding a milling cutter 101 or a grinding implement. The pattern 3 is secured to the work table. In this construction the valve is connected with the tracer by a linkage devoid of play functions so as to open, when the tracer is retracted from the pattern, and to close, when the tracer bears on the pattern, commensurate with the flow area required for the equalisation of pressure, due to the difference existing between the piston pressure and the weight of the spindle box. The feeds for adjusting the depth of cut are effected by means of a hand wheel 5 as shown in Fig. 2. The quick setting is effected by means of a handle 103 and a gear wheel 104 which is connected therewith and meshes with a rack 105 for the purpose of displacing the whole tracer head together with the control chamber secured thereto in a guide 107 on the spindle box 108 to any desired extent. The tracer head can be clamped fast in any desired position by clamping levers 109.

Figure 10:
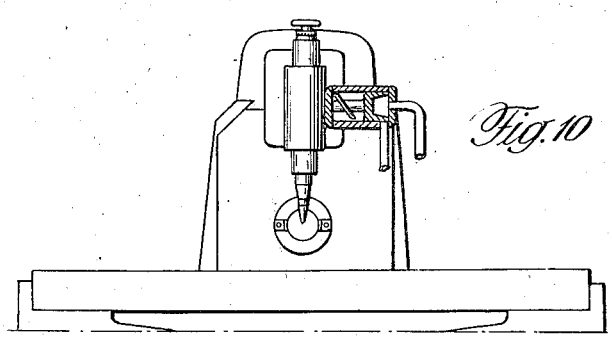
Fig. 10 is a view exemplifying a vertically operating copying device in which the tracer is positioned above the middle plane through the axis of the tool, that is, the work piece.

As shown in Fig. 10 the copying device can be so mounted on the machine that the tracer wipes over the pattern directly above the middle plane through the tool axis or the work axis.

Such an arrangement is a requisite for the production of patterned pieces which must be worked in rotating condition and the pattern for which is conveniently mounted with the rotating work on a common mandrel directly. Otherwise the operation of this arrangement is similar to that described in connection with Fig. 1.

Figure 11:
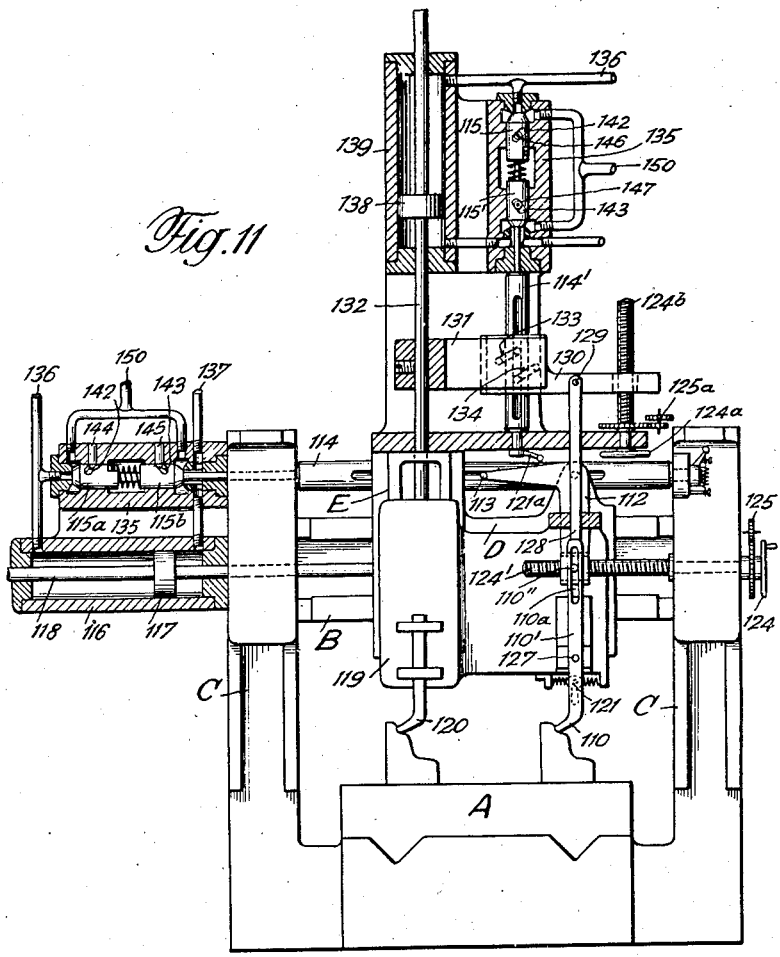
Fig. 11 shows by way of example a sectional front elevation of a sixth embodiment representing a hydraulic copying device provided on a planing machine.
Figure 12:
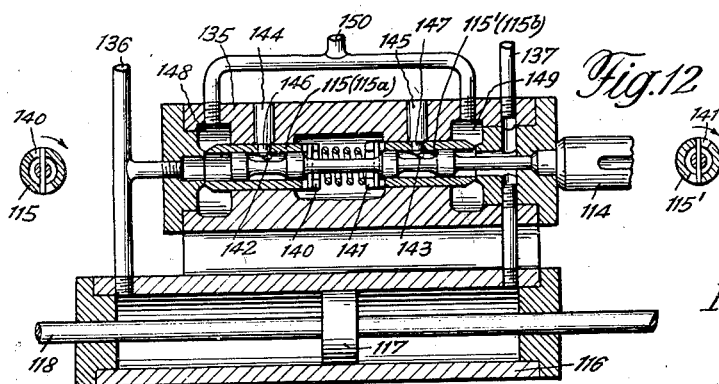
Fig. 12 is a view of a detail of Fig. 11.

The embodiment of the invention shown in Figs. 11 and 12 is arranged on a planing machine having a work table A and a cross member B which is adapted to be vertically shifted to and fro along guides on standards C. A slide D is movable along the cross member B by means of associated guides and thus in the transverse direction of the work table, which slide is provided with a guide member E for vertically guiding a slide 119 on which a tool 120 and a tracer 110 are arranged. For effecting the transverse movement of the slide 119, the tracer 110 is constructed as a two-armed rocking lever 110, 110' the rocking movements of which about a pivot 121 extending at right angles to the transverse movement are transmitted to a bell crank lever 112 by means of a pin and slot connection 110'', 110a. By means of a roller 113 this lever effects rotational displacement of the feed spindle 114 which carries out the corresponding control adjustments of the valve bodies 115a, 115b in the manner described in connection with Fig. 12. The valves 115a, 115b control the admission of pressure liquid to the working cylinder 116 which contains a piston 117, the piston rod 118 of which is firmly connected to the slide D.

For effecting the vertical movements of the slide 119 and thus those of the tool 120 and of the tracer 110 the slide 119 is firmly connected to the piston rod 132 of the piston 138 which is displaceable in a vertical working cylinder 139. A feed rod 128 bears against the tracer with its lower end, the upper end of this rod being secured to a vertically movable slide 130 by means of a bolt 129. The slide 130 is guided by means of sliding surfaces on a support 131 which is connected to the piston rod 132. On the support 131 levers 133, 134 are mounted which, as the slide 130 moves vertically, effect corresponding rotational displacement of the valve control rod 114' without lost motion. The levers 133, 134 function in exactly the same manner as the levers 18, 19 act on the valve control rod 22 of the first embodiment (Figs. 1 to 3).

The arrangement and the construction of the valves are shown in detail in Fig. 12, the arrangement and the construction of the valves controlling the working piston 117 and the piston 138 being similar to those shown. The valve control rod 114 rotationally displaces, while being rotationally displaced in one or the other direction by driving members 140, 141 situated in prolongation of the axis of this rod, either one of the valve sleeves 115, 115' by the driving pins 140, 141 bearing against the valve sleeves 115, 115' respectively during the rotational displacements to the right or left hand side. The valve sleeves 115, 115' are provided with helical grooves 142, 143, respectively, into which engage rollers 146, 147, respectively, on associated bolts 144, 145 mounted in the control head 135. The valve sleeves are rotationally adjusted in response to each rotational displacement of the valve control rod 114 and are in addition axially displaced, i. e. either opened or closed, by the action of the grooves 142, 143 cooperating with the rollers 146, 147, respectively, whereby pressure differences acting on the respective piston ends in the working cylinders 116, 139, respectively, are produced. The pressure fluid pipe lines 136, 137 which communicate with the control chambers 148, 149, respectively, and the associated cylinder ends in the working cylinders 116, 139 are each supplied by separately arranged pressure means. The returning pressure fluid discharging into the control chambers 148, 149 in consequence of corresponding valve control movements is passed into the feed supply tank of the hydraulic system through a conduit 150 collectively.

The tracer 110 may be preadjusted by a mechanism 121 in a manner similar to that described in connection which Figs. 6 and 7. Furthermore, setting by hand by means of a hand wheel 124 and a spindle 124' having steeply ascending screw threads may be provided as well as a transverse adjusting device mechanically controlled by a gear drive 125. Moreover, in a similar manner, preadjustment of the tracer in the vertical direction may be provided for by means of the lever 121a, as well as setting by hand by means of a hand wheel 124a and a spindle 124b. Alternatively, mechanical setting by means of a drive 125a may be provided.

All the embodiments previously described refer to hydraulic copying devices operating through the intermediary of tracer and pattern means. The device, according to the invention, permits feed movements of machine parts to be controlled also for other than copying purposes. The element controlling the feed movements is then not a tracer, but may be a member for rotationally adjusting the valve control rod by hand or by motor power.

Figures 13, 14:
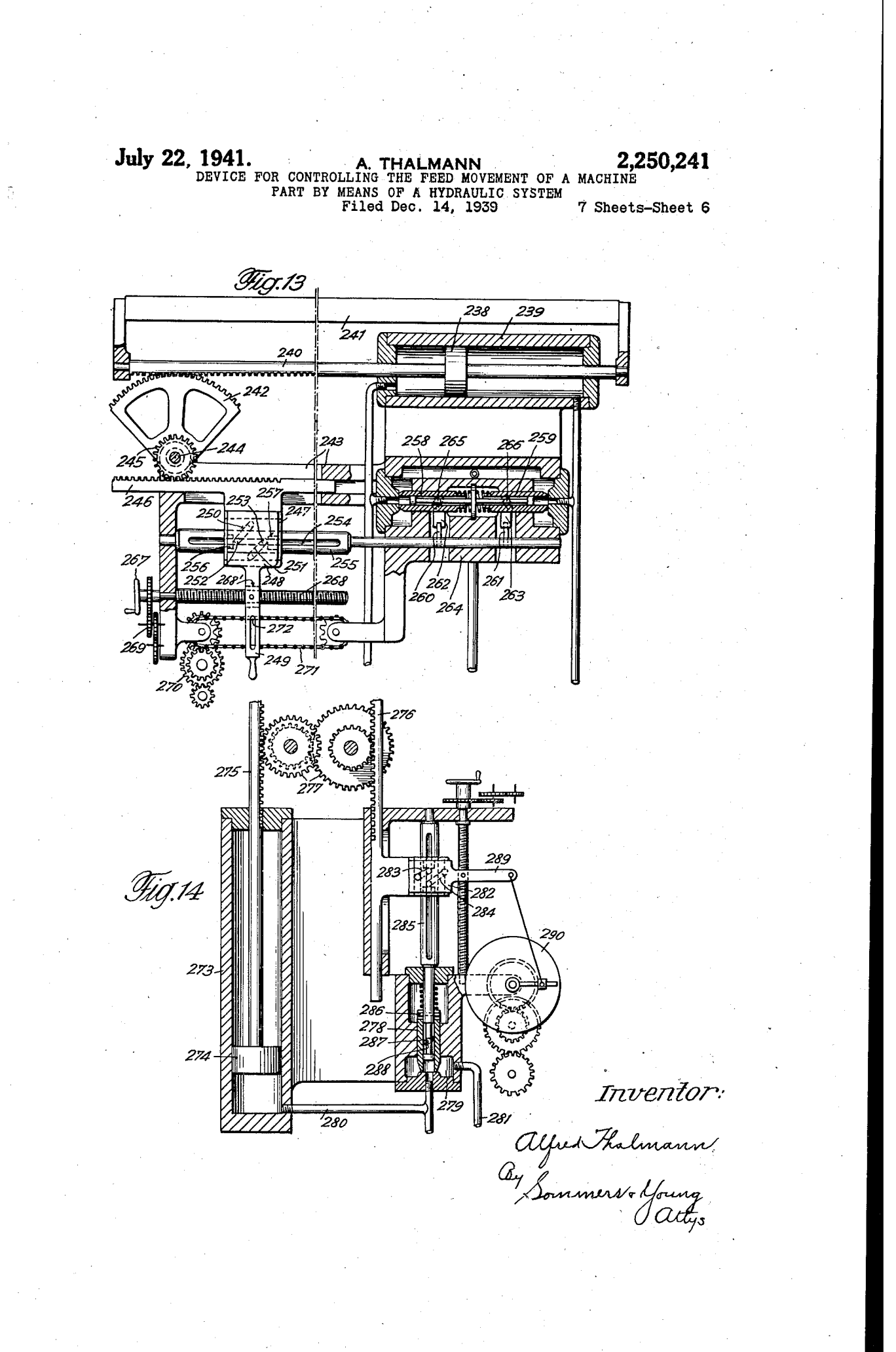

In the embodiment exemplifying the invention as shown in Fig. 13 the piston is designated by 238, the horizontally disposed working cylinder by 239, and the piston rod by 240, the part of the machine the feed movement of which is to be controlled and which may consist, for example, in the table 241, being firmly connected to the piston rod. The piston rod 240 is provided with a rack portion extending over part of its length for cooperation with a toothed sector 242 which is rockably mounted in the machine frame 243 by means of a shaft 244. The shaft 244 carries a pinion 245 meshing with a toothed feed rod 246 which is displaceably arranged in the machine frame. The travel of the feed rod 246 is shortened with respect to that of the piston in the relation of the radius of the pinion 245 to that of the toothed sector 242. The feed rod 246 carries a support 247 for a slide 248 on which a feed arm 249 is provided. In the support 247 the levers 250, 251 are pivotally mounted which interengage with the groove 254 in the valve control rod 255 by means of rollers 252, 253, respectively. The roller carrier levers 250, 251 are urged against the side surfaces of the groove 254 without play by means of abutments 256, 257, respectively. Each adjusting movement of the slide 248 to the left or right hand side of Fig. 13 produces a rotational displacement of the valve control rod 255 in one or the other direction through the intermediary of either of the roller carrier levers 250, 251. Such rotational displacements are transmitted to the valve sleeves 258, 259 by means of fingers 260, 261, respectively, on the valve control rod and mating projections 262, 263 on the valve sleeves, due to the fact that the valves and the valve control rods are not coaxially arranged. Since the fingers bear against the projections from opposite sides the valve sleeves 258, 259 are individually rotationally displaced dependent upon the direction in which the rotational displacement of the valve control rod takes place. In a control box 264 studs 265, 266 are fixed which project into spiral grooves in the valve sleeves 258, 259, respectively, and have the effect that the rotational displacements of the valve sleeves produce simultaneous axial displacements of these sleeves for opening the respective valves, for the purpose of varying the pressures on one or the other end of the piston 238. In this way the feed movement of the table 241 is controlled.

The control of this feed movement can be effected by hand by operating a lever 249 or a hand wheel 267 connected to a screw spindle 268 for shifting a nut 268' mounted in said lever. The control may also be mechanically effected via a drive 269 or by producing a continual reciprocatory movement of the lever 249 and a corresponding feed movement of the table 241 by means of a drive 270 operatively connected with a chain 271 having a driving element 272. The nut 268' must be releasable or in the absence of such releasing means the screw spindle must be provided with steeply ascending threads devoid of self-braking effect, in order that the control of the feed device can be effected selectively by hand or in mechanical fashion.

The embodiment shown in Fig. 14 represents again a feed device in which the feed travel is shortened with respect to the travel of the working piston. The device disclosed in Fig. 14 differs from that shown in Fig. 13 in that the working cylinder 273 containing a piston 274 is vertically acting. The machine part connected to the piston rod 275 and the feed movement of which is to be controlled is not shown. Also in this case the piston rod 275 is provided with a rack portion and is coupled to a feed rod 276, being also constructed as a rack, by means of a speed deceleration gear 277 for shortening the travel of the feed rod 276 relative to that of the piston rod. Let it be assumed that only the ascending movement of the working piston 274 is effected under fluid pressure, whereas the descending movement is effected by gravitational action of the piston and the said machine part. For this reason only a single valve having a valve sleeve 278 is provided which controls the fluid pressure on the working piston from below via a control chamber 279, supply conduit 280 and discharge conduit 281. If the valve 278 is closed the piston 274 is raised.

The control of the valve sleeve is effected through the intermediary of the same means as disclosed in the preceding example, namely, slide 282, roller carrier levers 283, 284 and valve control rod 285. The latter is in this instance, coaxial with the valve sleeve 278 so that the rotational adjustments thereof are directly transmitted to the valve sleeve by means of a pin 286, the rotational movement of the valve sleeve being transformed into axial movement thereof by means of a pin 287 cooperating with a spiral groove 288.

The control of the feed movement can also in this device be effected by manual operation of a feed lever 289 or mechanically, for example, by means of a crank drive 290.

The embodiment exemplified in Fig. 15 corresponds substantially to that shown in Fig. 14 in that the working piston 291 operates vertically and is effective only in the upward direction. However, the mechanism intercalated between the piston rod 292 and the feed rod 293 for shortening the travel of the latter relative to that of the piston rod is modified. This mechanism is provided with an oblique face 294 formed by a rule the inclination of which can be varied by rotational displacement about the fulcrum 295. The oblique face 294 is fixed to a toothed rule 296 which is horizontally displaceably arranged in guides 297. The gear teeth of the rule 296 mesh with a pinion 298 which in turn is in mesh with the rack portion of the piston rod 292. A roller 299 mounted on the feed rod 293 cooperates with the oblique face 294. Dependent upon the inclination adjusted for the oblique face 294 the travel of the feed rod 293 is shortened more or less relative to that of the piston rod. On the feed lever 300 a tracer 301 is arranged which cooperates with a model 302. The transmission of the feed movement from the feed lever to the valve sleeve is similar to that disclosed in connection with the example shown in Fig. 14.

The intermediary mechanism for varying the ratio of gearing between the piston rod and the feed rod has the advantage that one and the same model or pattern can be copied off in various different sizes. Alternatively, the mechanism may be so constructed that the travel of the feed rod is increased relative to that of the working piston.

What I claim is:

1. In a device for controlling the feed movement of a machine part by means of a hydraulic system, a machine having a part to be fed, a tracer adjustably arranged in a tracer head for controlling the feed movement of said machine part in accordance with feed impulses imparted thereto, a hydraulic cylinder, a piston secured to said machine part adjustably arranged in said cylinder, a pressure fluid control valve, a control chamber accommodating said valve arranged independently of said cylinder, a linkage free from lost motion positively operatively interconnecting said tracer and said valve for adjusting said valve in accordance with said feed impulses, said linkage including a rotatably mounted valve rod, means connecting said control element with said rod to rotate said rod in dependence on control movements of said element, a helical guide member, an adjustable counteracting member engaging said rod, and means engaging said helical guide member to convert the rotative movement of the rod into axial translation with simultaneous rotation and translatory displacement of the valve to open or close the valve; and pressure fluid pipe lines leading into said cylinder via said valve for adjusting said piston by means of said fluid in accordance with said valve adjustments.

2. In a device for controlling the feed movement of a machine part by means of a hydraulic system, a machine having a part to be fed, a tracer adjustably arranged in a tracer head for controlling the feed movement of said machine part in accordance with feed impulses imparted thereto, a hydraulic cylinder, a piston secured to said machine part adjustably arranged in said cylinder, a pressure fluid control valve, a control chamber accommodating said valve arranged independently of said cylinder, a rotationally adjustable control rod positively operatively interconnecting said tracer and said valve for adjusting said valve in accordance with said feed impulses, a helical collar on said rod cooperating with adjustable complementary means for transforming said rotational adjustments of said rod into axial displacements thereof for accordingly opening said valve, and pressure fluid pipe lines leading into said cylinder via said valve for adjusting said piston by means of said fluid in accordance with said valve adjustments.

3. In a device for controlling the feed movement of a machine part by means of a hydraulic system, a machine having a part to be fed, a tracer adjustably arranged in a tracer head for controlling the feed movement of said machine part in accordance with feed impulses imparted thereto, a hydraulic cylinder, a piston secured to said machine part adjustably arranged in said cylinder, a pressure fluid control valve, a control chamber accommodating said valve arranged independently of said cylinder, a rotationally adjustable control rod for said valve having a longitudinal groove, transmission means positively operatively interconnecting said tracer and said valve control rod by engaging into said groove for adjusting said valve in accordance with said feed impulses, a helical collar on said rod cooperating with adjustable complementary means for transforming said rotational adjustments of said rod into axial displacements thereof for accordingly opening said valve, and pressure fluid pipe lines leading into said cylinder via said valve for adjusting said piston by means of said fluid in accordance with said valve adjustments.

4. In a device for controlling the feed movement of a machine part by means of a hydraulic system, a machine having a part to be fed, a tracer for controlling the feed movement of said machine part in accordance with feed impulses imparted thereto carried by a tracer sleeve, an adjusting sleeve adjustably connected with said tracer sleeve, a tracer head receiving a guide sleeve axially displaceably guiding said former two sleeves and carrying a driving member, a hydraulic cylinder, a piston secured to said machine part adjustably arranged in said cylinder, a pressure fluid control valve for vertical copying work, a control chamber accommodating said valve arranged independently of said cylinder, a rotationally adjustable control rod for said valve having a longitudinal groove for interengagement with said driving member for positively operatively interconnecting said tracer and said valve for adjusting said valve in accordance with said feed impulses, a helical collar on said rod cooperating with adjustable complementary means for transforming said rotational adjustments of said rod into axial displacements thereof in addition to the rotational adjustments thereof for accordingly opening said valve, and pressure fluid pipe lines leading into said cylinder via said valve for adjusting said piston by means of said fluid in accordance with said valve adjustments.

5. In a device for controlling the feed movement of a machine part by means of a hydraulic system, a machine having a part to be fed, a tracer for controlling the feed movement of said machine part in accordance with feed impulses imparted thereto carried by a tracer sleeve, an adjusting sleeve adjustably connected with said tracer sleeve, a tracer head adjustably receiving a guide sleeve axially displaceably guiding said former two sleeves, a cross slide rotationally adjustably holding said tracer head, a slide plate displaceably carrying said cross slide, a hydraulic cylinder, a piston secured to said machine part adjustably arranged in said cylinder, a pressure fluid control valve, a control chamber accommodating said valve arranged independently of said cylinder, a rotationally adjustable control rod fixedly connected with said valve for positively operatively interconnecting said tracer and said valve for adjusting said valve in accordance with said feed impulses, a helical collar on said rod cooperating with adjustable complementary means for transforming said rotational adjustments of said rod into axial displacements thereof for accordingly opening said valve, and pressure fluid pipe lines leading into said cylinder via said valve for adjusting said piston by means of said fluid in accordance with said valve adjustments.

6. In a device for controlling the feed movement of a machine part by means of a hydraulic system, a machine having a part to be fed, a tracer adjustably arranged in a tracer head for controlling the feed movement of said machine part in accordance with feed impulses imparted thereto, a cross slide rotationally adjustably holding said tracer head and having two oblique abutment faces, a slide plate displaceably carrying said cross slide, two transmission levers mounted in said slide plate, driving members on said levers, a hydraulic cylinder, a piston secured to said machine part adjustably arranged in said cylinder, two pressure fluid control valves for transverse copying work, a control chamber accommodating said valves, arranged independently of said cylinder, a rotationally adjustable control rod for said valves having a longitudinal groove for interengagement with said driving members, said members cooperating with said abutment faces for rotationally displacing said valve control rod in opposite directions as said slide moves transversely, a helical guide member, an adjustable counteracting member, means engaging said guide member to convert the rotative movement into axial translation with simultaneous rotation and translation of the valve to open or close same and pressure fluid pipe lines leading into said cylinder via said valves for adjusting said piston by means of said fluid in accordance with said valve adjustments.

7. In a device for controlling the feed movement of a machine part by means of a hydraulic system, a machine having a part to be fed, a tracer adjustably arranged in a tracer head, for controlling the feed movement of said machine part in accordance with feed impulses imparted thereto, a hydraulic cylinder, a piston secured to said machine part adjustably arranged in said cylinder, two pressure fluid control valves for transverse copying work, a control chamber accommodating the two bodies of said valves arranged independently of said cylinder, a rotationally adjustable shouldered control rod positively operatively interconnecting said tracer and said valves for adjusting said valves in accordance with oppositely directed feed impulses imparted to said element during the transverse copying, a helical collar on said rod cooperating with adjustable complementary means for transforming said rotational adjustments of said rod into oppositely directed axial displacements thereof, said valve bodies being spaced on said rod by two shoulders for individually opening said valves in opposite directions of displacement of said rod, and pressure fluid pipe lines leading into said cylinder on opposite piston sides via the respective valves for adjusting said piston by means of said fluid in accordance with said valve adjustments.

8. In a device for controlling the feed movement of a machine part by means of a hydraulic system, a machine tool having a tool carrier to be fed longitudinally of a cross carrier arm on the machine frame, a tracer for controlling the feed movement of said tool carrier in accordance with feed impulses imparted thereto carried by a tracer sleeve, an adjusting sleeve adjustably connected with said tracer sleeve, a tracer head adjustably receiving a guide sleeve axially displaceably guiding said former two sleeves, a cross slide rotationally adjustably holding said tracer head, a slide plate displaceably carrying said cross slide, said slide plate and said tool carrier being guided by said cross carrier arm, a hydraulic cylinder, a piston secured to said tool carrier and to said slide plate adjustably arranged in said cylinder, two pressure fluid control valves for transverse copying work, a control chamber accommodating said valves arranged independently of said cylinder, a rotationally adjustable control rod positively operatively interconnecting said tracer and said valves for adjusting said valves in accordance with said feed impulses, and pressure fluid pipe lines leading into said cylinder via said valves for adjusting said piston by means of said fluid in accordance with said valve adjustments.

9. In a device for controlling the feed movement of a machine part by means of a hydraulic system, a machine having a part to be fed, a tracer adjustably arranged in a tracer head for controlling the feed movement of said machine part in accordance with feed impulses imparted thereto, a hydraulic cylinder, a piston secured to said machine part adjustably arranged in said cylinder, a pressure fluid control valve for transverse copying work, a control chamber accommodating said valve, a linkage free from lost motion positively operatively interconnecting said tracer and said valve for adjusting said valve in accordance with said feed impulses, said linkage including a rotatably mounted valve rod, means connecting said control element with said rod to rotate said rod in dependence on control movements of said element, a helical guide member, an adjustable counteracting member engaging said rod, and means engaging said helical guide member to convert the rotative movement of the rod into axial translation with simultaneous rotation and translatory displacement of the valve to open or close the valve; a vertically displaceable slide arranged in said machine for carrying said cylinder and said control chamber independently of each other, and flexible pressure fluid conduits leading into said cylinder via said control chamber for adjusting said piston by means of said fluid in accordance with said valve adjustments.

10. In a device for controlling the feed movement of a machine part by means of a hydraulic system, a machine tool having a tool carrier to be fed, a tracer adjustably arranged in a tracer head for controlling the feed movement of said tool carrier in accordance with feed impulses imparted thereto, mechanically actuated means for adjusting said tracer relative to said tool carrier, a hydraulic cylinder, a piston secured to said tool carrier adjustably arranged in said cylinder, a pressure fluid controlled valve, a control chamber accommodating said valve arranged independently of said cylinder, a linkage free from lost motion positively operatively interconnecting said tracer and said valve for adjusting said valve in accordance with said feed impulses, said linkage including a rotatably mounted valve rod, means connecting said control element with said rod to rotate said rod in dependence on control movements of said element, a helical guide member, an adjustable counteracting member engaging said rod, and means engaging said helical guide member to convert the rotative movement of the rod into axial translation with simultaneous rotation and translatory displacement of the valve to open or close the valve; and pressure fluid pipe lines leading into said cylinder via said valve for adjusting said piston by means of said fluid in accordance with said valve adjustments.

11. In a device for controlling the feed movement of a machine part by means of a hydraulic system, a machine tool having a work carrier to be fed, a tracer adjustably arranged in a tracer head for controlling the feed movement of said work carrier in accordance with feed impulses imparted thereto, mechanically actuated means for adjusting said tracer relative to said work carrier, a hydraulic cylinder, a piston secured to said work carrier adjustably arranged in said cylinder, a pressure fluid controlled valve, a control chamber accommodating said valve arranged independently of said cylinder, a linkage free from lost motion positively operatively interconnecting said tracer and said valve for adjusting said valve in accordance with said feed impulses, said linkage including a rotatably mounted valve rod, means connecting said control element with said rod to rotate said rod in dependence on control movements of said element, a helical guide member, an adjustable counteracting member engaging said rod, and means engaging said helical guide member to convert the rotative movement of the rod into axial translation with simultaneous rotation and translatory displacement of the valve to open or close the valve; and pressure fluid pipe lines leading into said cylinder via said valve for adjusting said piston by means of said fluid in accordance with said valve adjustments.

12. In a device for controlling the feed movement of a machine part by means of a hydraulic system, a machine tool having a tool carrier to be fed, a tracer adjustably arranged in a tracer head for controlling the feed movement of said tool carrier in accordance with feed impulses imparted thereto, a mechanically actuated device for adjusting said tracer relative to said tool carrier, a motor driven declutchable feed drive included in said device, hand control means for actuating said device with said drive declutched, a hydraulic cylinder, a piston secured to said tool carrier adjustably arranged in said cylinder, a pressure fluid controlled valve, a control chamber accommodating said valve arranged independently of said cylinder, a linkage free from lost motion positively operatively interconnecting said tracer and said valve for adjusting said valve in accordance with said feed impulses, said linkage including a rotatably mounted valve rod, means connecting said control element with said rod to rotate said rod in dependence on control movements of said element, a helical guide member, an adjustable counteracting member engaging said rod, and means engaging said helical guide member to convert the rotative movement of the rod into axial translation with simultaneous rotation and translatory displacement of the valve to open or close the valve; and pressure fluid pipe lines leading into said cylinder via said valve for adjusting said piston by means of said fluid in accordance with said valve adjustments.

13. In a device for controlling the feed movement of a machine part by means of a hydraulic system, a machine tool having a tool carrier to be fed, a tracer adjustably arranged in a tracer head for controlling the feed movement of said tool carrier in accordance with feed impulses imparted thereto, a mechanically actuated device for adjusting said tracer relative to said tool carrier, terminal stops for limiting the travel of said tracer, a declutchable feed drive included in said device, a motor for driving said drive, electric switches cooperating with said stops for varying the condition of operation of said motor, hand control means for actuating said device with said drive declutched, a hydraulic cylinder, a piston secured to said tool carrier adjustably arranged in said cylinder, a pressure fluid controlled valve, a control chamber accommodating said valve arranged independently of said cylinder, a linkage free from lost motion positively operatively interconnecting said tracer and said valve for adjusting said valve in accordance with said feed impulses, said linkage including a rotatably mounted valve rod, means connecting said control element with said rod to rotate said rod in dependence on control movements of said element, a helical guide member, an adjustable counteracting member engaging said rod, and means engaging said helical guide member to convert the rotative movement of the rod into axial translation with simultaneous rotation and translatory displacement of the valve to open or close the valve; and pressure fluid pipe lines leading into said cylinder via said valve for adjusting said piston by means of said fluid in accordance with said valve adjustments.

14. In a device for controlling the feed movement of a machine part by means of a hydraulic system, a machine tool having a tool carrier to be fed, a tracer adjustably arranged in a tracer head for controlling the feed movement of said tool carrier in accordance with feed impulses imparted thereto, a cross slide rotationally adjustably holding said tracer head arranged in said machine, a mechanically actuated device for adjusting said tracer relative to said tool carrier, a declutchable feed drive included in said device, a motor for driving said drive, hand control means for actuating said device with said drive declutched, a screw spindle carrying said hand control means clutchable to said feed drive, a nut mounted in said cross slide carried by said spindle for displacing said slide by turning said spindle, a hydraulic cylinder, a piston secured to said tool carrier adjustably arranged in said cylinder, a pressure fluid controlled valve, a control chamber accommodating said valve arranged independently of said cylinder, a linkage free from lost motion positively operatively interconnecting said tracer and said valve for adjusting said valve in accordance with said feed impulses, said linkage including a rotatably mounted valve rod, means connecting said control element with said rod to rotate said rod in dependence on control movements of said element, a helical guide member, an adjustable counteracting member engaging said rod, and means engaging said helical guide member to convert the rotative movement of the rod into axial translation with simultaneous rotation and translatory displacement of the valve to open or close the valve; and pressure fluid pipe lines leading into said cylinder via said valve for adjusting said piston by means of said fluid in accordance with said valve adjustments.

15. In a device for controlling the feed movement of a machine part by means of a hydraulic system, a machine tool having a tool carrier to be fed, a tracer adjustably arranged in a tracer head, for controlling the feed movement of said tool carrier in accordance with feed impulses imparted thereto, a hydraulic cylinder, a piston secured to said tool carrier adjustably arranged in said cylinder, a pressure fluid controlled valve for vertical copying work, a control chamber accommodating said valve arranged independently of said cylinder, a rotationally adjustable control rod positively operatively interconnecting said tracer and said valve for adjusting said valve in accordance with said feed impulses, a gear wheel mounted on said control rod, a feed drive arranged in said machine and having a hand control means, a rack cooperating with said gear wheel and said hand control means by means of said feed drive for vertical adjusting movement of said tool carrier, and pressure fluid pipe lines leading into said cylinder via said valve for adjusting said piston by means of said fluid in accordance with said valve adjustments.

16. In a device for controlling the feed movement of a machine part by means of a hydraulic system, a machine having a part to be fed, a tracer adjustably arranged in a tracer head for controlling the feed movement of said machine part in accordance with feed impulses imparted thereto by a pattern, a hydraulic cylinder, a piston secured to said machine part adjustably arranged in said cylinder, a pressure fluid control valve for transverse copying work, a control chamber accommodating said valve arranged independently of said cylinder, a rotationally adjustable control rod positively operatively interconnecting said tracer and said valve for adjusting said valve in accordance with said feed impulses, a lever arm secured to said control rod and rockably adjustable to both sides of a median position for directing the transverse copying movement of said tracer to a certain side without the assistance of said pattern, and pressure fluid pipe lines leading into said cylinder via said valve for adjusting said piston by means of said fluid in accordance with said valve adjustments.

17. In a device for controlling the feed movement of a machine part by means of a hydraulic system, a machine having a part to be fed, a tracer adjustably arranged in a tracer head for controlling the feed movement of said machine part in accordance with feed impulses imparted thereto by a pattern, a hydraulic cylinder, a piston secured to said machine part adjustably arranged in said cylinder, a pressure fluid control valve for transverse copying work, a control chamber accommodating said valve arranged independently of said cylinder, a rotationally adjustable control rod positively operatively interconnecting said tracer and said valve for adjusting said valve in accordance with said feed impulses, a lever arm secured to said control rod and rockably adjustable to both sides of a median position for directing the transverse copying movement of said tracer to a certain side without the assistance of said pattern, stops for said lever to bear against in either rocking position adjusted, a spring connected to said lever for retaining it in either position of adjustment, and pressure fluid pipe lines leading into said cylinder via said valve for adjusting said piston by means of said fluid in accordance with said valve adjustments.

18. In a device for controlling the feed movement of a machine part by means of a hydraulic system, a machine tool having a tool to be fed, a pivotal two-armed tracer for controlling said tool in accordance with feed impulses imparted thereto arranged with said tool on a common slide for pivoting about a horizontal axis, two hydraulic cylinders and associated pistons for vertical and transverse copying respectively, the former piston directly secured to said slide, pressure fluid plug valves associated with said cylinders for adjusting said pistons concomitant to being adjusted by said feed impulses, a bell crank lever intercalated between said tracer and the transverse copying valve for adjusting said valve, a control chamber for each valve arranged independently of said cylinders, and pressure fluid pipe lines leading into said cylinders via the respective valves for pressure fluid adjustment of said pistons according to said valve adjustments.

19. In a device for controlling the feed movement of a machine part by means of a hydraulic system, a machine tool having a tool to be fed, a pivotal two-armed tracer for controlling said tool in accordance with feed impulses imparted thereto arranged with said tool on a common slide for pivoting about a horizontal axis, two hydraulic cylinders and associated pistons for vertical and transverse copying respectively, the former piston directly secured to said slide, pressure fluid plug valves associated with said cylinders for adjusting said pistons concomitant to being rotationally adjusted by said feed impulses, a control chamber for each valve arranged independently of said cylinders, sleeve-like valve plugs axially slidable in bearing surfaces in said valves, pin and cam slot connections between said surfaces and said plugs for transforming said rotational adjustments into axial plug movements, a bell crank lever intercalated between said tracer and the transverse copying valve for adjusting said valve, and pressure fluid pipe lines leading into said cylinders via the respective valves for pressure fluid adjustment of said pistons according to said valve adjustments.

20. In a device for controlling the feed movement of a machine part by means of a hydraulic system, a machine tool having a tool to be fed, a pivotal two-armed tracer for controlling said tool in accordance with feed impulses imparted thereto arranged with said tool on a common slide for pivoting about a horizontal axis, two hydraulic cylinders and associated pistons for vertical and transverse copying respectively, the former piston directly secured to said slide, pressure fluid plug valves associated with said cylinders for adjusting said pistons concomitant to being rotationally adjusted by said feed impulses, a control chamber for each valve arranged independently of said cylinders, sleeve-like valve plugs axially slidable in bearing surfaces in said valves, pin and cam slot connections between said surfaces and said plugs for transforming said rotational adjustments into axial plug movements, a bell crank lever intercalated between said tracer and the transverse copying valve for adjusting said valve, a rod for transmitting the vertical tracer feed movements, means for rotationally displacing the valve plugs controlling the piston for vertically adjusting said slide as transmitted by said feed rod, and pressure fluid pipe lines leading into said cylinders via the respective valves for pressure fluid adjustment of said pistons according to said valve adjustments.

21. In a device for controlling the feed movement of a machine part by means of a hydraulic system, a machine having a part to be fed, a controllable element for controlling the feed movement of said machine part in accordance with feed impulses imparted thereto, a hydraulic cylinder, a piston secured to said machine part adjustably arranged in said cylinder, by means of a piston rod, a pressure fluid controlled valve, a control chamber accommodating said valve arranged independently of said cylinder, a linkage free from lost motion positively operatively interconnecting said element and said valve, said linkage including a rotatably mounted valve rod, means connecting said control element with said rod to rotate said rod in dependence on control movements of said element, a helical guide member, an adjustable counteracting member engaging said rod, and means engaging said helical guide member to convert the rotative movement of the rod into axial translation with simultaneous rotation and translatory displacement of the valve to open or close the valve; a mechanism intercalated between said piston rod and said control member permitting the travel of said member to be varied relative to that of said piston rod, and pressure fluid pipe lines leading into said cylinder via said valve for adjusting said piston by means of said fluid in accordance with said valve adjustments.

22. In a device for controlling the feed movement of a machine part by means of a hydraulic system, a machine having a part to be fed, a tracer adjustably arranged in a tracer head for controlling the feed movement of said machine part in accordance with feed impulses imparted thereto, a hydraulic cylinder, a piston secured to said machine part adjustably arranged in said cylinder by means of a piston rod having a rack portion, a pressure fluid controlled valve, a control chamber accommodating said valve arranged independently of said cylinder, a linkage free from lost motion positively operatively interconnecting said tracer and said valve, a control rack provided in said linkage for adjusting said valve in accordance with said feed impulses a ratio gear intercalated between said rack portion of said piston and said control rack, for varying the travel of said control rack relative to that of said piston rod, and pressure fluid pipe lines leading into said cylinder via said valve for adjusting said piston by means of said fluid in accordance with said valve adjustments.

23. In a device for controlling the feed movement of a machine part by means of a hydraulic system, a machine having a part to be fed, a tracer adjustably arranged in a tracer head for controlling the feed movement of said machine part in accordance with feed impulses imparted thereto, a hydraulic cylinder, a piston secured to said machine part adjustably arranged in said cylinder, by means of a piston rod, a pressure fluid controlled valve, a control chamber accommodating said valve arranged independently of said cylinder, a linkage free from lost motion positively operatively interconnecting said tracer and said valve, a control member provided in said linkage for adjusting said valve in accordance with said feed impulses, a transmission member having an oblique face, a pinion on said transmission member cooperating with said piston rod for longitudinally displacing said transmission member by said rod, a guide roller on said control member for cooperation with said transmission member, said transmission member permitting the travel of said control member to be varied relative to that of said piston rod, a control chamber accommodating said valve arranged independently of said cylinder, and pressure fluid pipe lines leading into said cylinder via said valve for adjusting said piston by means of said fluid in accordance with said valve adjustments.

24. In a device for controlling the feed movement of a machine part by means of a hydraulic system, a machine having a part to be fed, a tracer adjustably arranged in a tracer head for controlling the feed movement of said machine part in accordance with feed impulses imparted thereto, a hydraulic cylinder, a piston secured to said machine part adjustably arranged in said cylinder, by means of a piston rod, a pressure fluid controlled valve, a control chamber accommodating said valve arranged independently of said cylinder, a linkage free from lost motion positively operatively interconnecting said tracer and said valve, a control member provided in said linkage for adjusting said valve in accordance with said feed impulses, a transmission member having an oblique face, means for adjusting the obliquity of said face, a pinion on said transmission member cooperating with said piston rod for longitudinally displacing said transmission member by said rod, a guide roller on said control member for cooperation with said transmission member, said transmission member permitting the travel of said control member to be adjustably varied relative to that of said piston rod, and pressure fluid pipe lines leading into said cylinder via said valve for adjusting said piston by means of said fluid in accordance with said valve adjustments.

25. In a device for controlling the feed movement of a machine part by means of a hydraulic system, a machine having a part to be fed, a controllable element for controlling the feed movement of said machine part in accordance with feed impulses imparted thereto, a hydraulic cylinder, a piston secured to said machine part adjustably arranged in said cylinder by means of a piston rod, a pressure fluid controlled valve including two sleeve like valve bodies on a common axis, a control chamber accommodating said valve arranged independently of said cylinder, a rotationally adjustable control rod eccentrically arranged to said valve axis, cooperating driving dogs interposed between said control rod and said valve sleeves for rotationally adjusting said sleeves by said control rod, a linkage including said control rod and interconnecting said element and said valve free from lost motion, a control member provided in said linkage for adjusting said valve in accordance with said feed impulses, a mechanism intercalated between said piston rod and said control member permitting the travel of said member to be varied relative to that of said piston rod, and pressure fluid pipe lines leading into said cylinder via said valve for adjusting said piston by means of said fluid in accordance with said valve adjustments.

26. In apparatus of the kind described, a machine part the operative movement of which is to be controlled, a hydraulic motor for actuating said machine part, said motor comprising a cylinder and a piston therein, a hydraulic fluid control valve, a valve casing independent of said cylinder, a hydraulic conduit connecting said valve with said cylinder, a control element, valve actuating mechanism positively connecting said control element with said valve, said valve actuating mechanism being free of lost motion and including a rotatably mounted valve rod, means connecting said control element with said rod to rotate said rod in dependence on control movements of said element, a helical guide member, an adjustable counteracting member engaging said rod, and means engaging said helical guide member to convert the rotative movement of the rod into axial translation with simultaneous rotation and translatory displacement of the valve to open or close the valve.

ALFRED THALMANN.